United States Patent
Damitz et al.

(10) Patent No.: US 7,421,331 B2
(45) Date of Patent: Sep. 2, 2008

(54) METHOD FOR OPERATING AN INTERNAL COMBUSTION ENGINE, PARTICULARLY OF A MOTOR VEHICLE

(75) Inventors: Jens Damitz, Illingen (DE); Michael Kessler, Weissach (DE); Wolfgang Tiebel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 11/712,193

(22) Filed: Feb. 27, 2007

(65) Prior Publication Data
US 2007/0209637 A1    Sep. 13, 2007

(30) Foreign Application Priority Data
Feb. 28, 2006  (DE) ............... 10 2006 009 067

(51) Int. Cl.
*G06F 17/00* (2006.01)
*F02M 51/00* (2006.01)
*F02D 41/26* (2006.01)
*F02D 41/04* (2006.01)

(52) U.S. Cl. ............. 701/104; 701/105; 701/111; 123/435; 123/478

(58) Field of Classification Search ......... 701/101–105, 701/111, 115; 123/435, 436, 478, 480, 486
See application file for complete search history.

(56) References Cited

U.S. PATENT DOCUMENTS

| 6,789,531 | B1* | 9/2004 | Remmels ............... 123/357 |
| 6,837,214 | B2* | 1/2005 | Doelker et al. .......... 123/329 |
| 7,168,408 | B2* | 1/2007 | Toda ..................... 123/196 S |

FOREIGN PATENT DOCUMENTS

DE    197 05 463    8/1998

* cited by examiner

*Primary Examiner*—Willis R Wolfe, Jr.
(74) *Attorney, Agent, or Firm*—Kenyon & Kenyon LLP

(57) ABSTRACT

A method for operating an internal combustion engine, particularly of a motor vehicle. The internal combustion engine has a combustion chamber and an injection valve by which fuel is able to be supplied to the combustion chamber, directly or via an intake manifold. In the method, a maximum combustion chamber pressure and a signal for a start of the injection of fuel is determined, and the signal for the start of injection is influenced as a function of the maximum combustion chamber pressure. A signal for an injection duration of fuel is determined and influenced as a function of the maximum combustion chamber pressure.

17 Claims, 2 Drawing Sheets

METHOD FOR OPERATING AN INTERNAL COMBUSTION ENGINE, PARTICULARLY OF A MOTOR VEHICLE

FIELD OF THE INVENTION

The present invention relates to a method for operating an internal combustion engine, particularly of a motor vehicle. The present invention also relates to a corresponding computer program and a corresponding storage medium. Furthermore, the present invention relates to a control device for an internal combustion engine, particularly of a motor vehicle. The present invention is able to be used in gasoline and diesel internal combustion engines as well as in internal combustion engines having direct injection and manifold injection.

BACKGROUND INFORMATION

German Patent Application No. DE 197 05 463 A1 describes a method for operating an internal combustion engine where fuel is supplied into a combustion chamber with the aid of an injection valve. In the method, the pressure in a combustion chamber of the internal combustion engine is measured. A correction-value determinator ascertains whether the maximum value of the combustion chamber pressure is greater than a predefined threshold value. If this is the case, a setpoint value for the start of the fuel injection, which is ascertained by a setpoint input, is corrected correspondingly, preferably in the direction of retarding the start of injection. This is meant to ensure that the maximum value of the combustion chamber pressure becomes smaller again than the threshold value.

Diesel combustion engines, in particular, are often configured in such a way that, at high engine speeds, it is not only ensured that the maximally permissible combustion chamber pressure is achieved, but also the maximally allowed temperature in the discharge zone of the internal combustion engine. If the start of injection is thereupon retarded in order to restrict the maximum combustion chamber pressure, then this may lead to a further increase in the temperature in the discharge zone. The maximally permissible temperature in the discharge zone may thereby be exceeded. This may lead to damage in the discharge zone of the internal combustion engine, for instance in an exhaust-gas turbocharger downstream from the internal combustion engine.

SUMMARY

It is an object of the present invention to provide a method for operating an internal combustion engine in which damage to components in the discharge zone is prevented.

According to an example embodiment of the present invention, a signal for a fuel injection duration is determined and is influenced it as a function of the maximum combustion chamber pressure. This influencing of the injection duration may make it possible to counteract an increase in the temperature in the discharge zone of the internal combustion engine. That is to say, if the maximum combustion chamber pressure exceeds the predefined threshold value, and if the start of injection is subsequently retarded in order to restrict the combustion chamber pressure, then the increase in the temperature in the discharge zone of the internal combustion engine possibly resulting therefrom may be compensated according to an example embodiment of the present invention, in that the duration of the fuel injection is influenced as a function of the determined maximum combustion chamber pressure or the shift in the start of injection.

Using the present invention, it is possible to prevent an exceeding of the maximally tolerated temperature in the discharge zone of the internal combustion engine. Damage to components disposed there, in particular a downstream exhaust-gas turbocharger, may therefore be avoided.

In one advantageous embodiment of the present invention, the signal for the injection duration is influenced in the direction of shortening the injection duration. Since the fuel mass to be injected is reduced, it is ensured that the temperature of the generated exhaust gas is lowered, or at least not increased. The temperature in the discharge zone of the internal combustion engine may thus be restricted to the maximally permitted temperature.

Another advantageous embodiment of the present invention regulates the influencing of the signal for the injection duration. This may allow a setpoint value to-be input for the maximally permissible temperature in the discharge zone of the internal combustion engine and to be taken into account in the method according to the present invention.

In advantageous developments of the present invention, the signal for the start of injection and the signal for the injection duration relate either to a main injection or to one or a plurality of pre-injection/s. Therefore, if fuel is supplied to the combustion chamber of the internal combustion engine with the aid of one or a plurality of pre-injection/s and one main injection, via the fuel injector, then the method according to the present invention may be applied both to the pre-injection/s and to the main injection.

In another advantageous novel development of the present invention, a maximum combustion chamber pressure is determined and compared to a setpoint value for the maximum combustion chamber pressure, and monitoring is activated if the maximum combustion chamber pressure becomes greater than the setpoint value for the maximum combustion chamber pressure. Such monitoring is able to prevent potential overheating of the discharge zone and thus destruction of the internal combustion engine, preferably by operating the internal combustion engine under emergency conditions or by informing an operator of the internal combustion engine.

Additional features, example applications and advantages of the present invention are derived from the following description of exemplary embodiments of the present invention, which are illustrated in the figures. For this purpose, all of the described or illustrated features form the subject of the present invention, either alone or in any combination, irrespective of their combination in the patent claims or their antecedent references and also irrespective of their respective formulation and illustration in the description and in the figures.

DETAILED DESCRIPTION OF EXAMPLE EMBODIMENTS

Figure 1A:
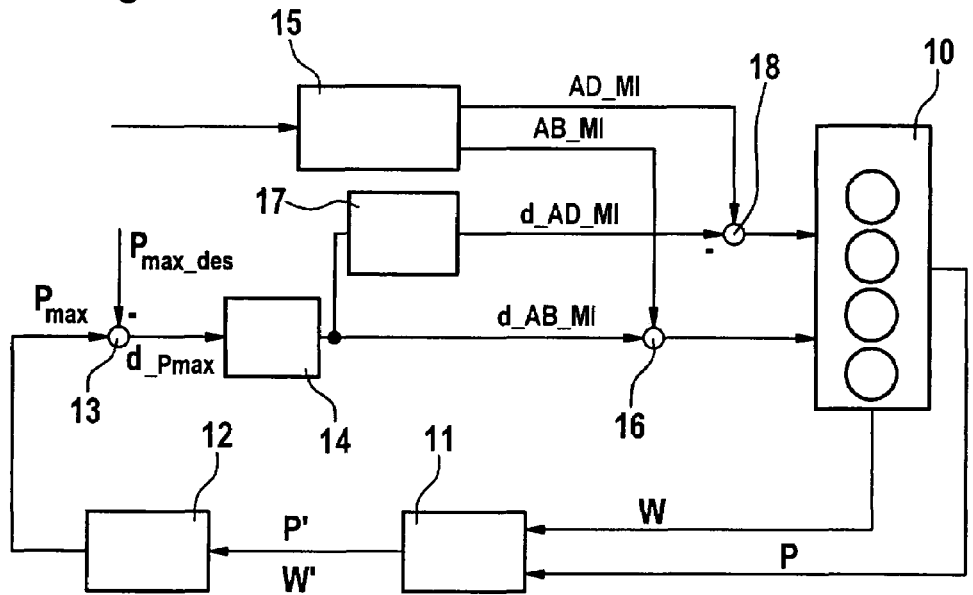
FIGS. 1a, 1b, 2 and 3 illustrate schematic block diagrams of four exemplary embodiments of a method according to the present invention for operating an internal combustion engine.

FIG. 1a shows a first exemplary embodiment of a method for operating an internal combustion engine 10. Internal combustion engine 10 may preferably be provided for driving a motor vehicle. Internal combustion engine 10 may have direct injection or manifold injection and be intended for gasoline or diesel fuel.

Sensors, which are able to measure performance quantities of internal combustion engine 10, are assigned to internal combustion engine 10. In FIG. 1a, combustion chamber pressure P in one of the cylinders, as well as angle of rotation W of the crankshaft of internal combustion engine 10 are measured by way of example. It is understood that, alternatively or additionally, other performance quantities of internal combustion engine 10 may be measured as well. It is likewise understood that the measurement of individual performance quantities may be derived from other performance quantities, by modeling or in some other manner.

Combustion chamber pressure P and angle of rotation W are forwarded to an optional signal conditioner 11. For instance, a possible electrical or thermal drift of the measured signals maybe corrected in signal conditioner 11. It is also possible to take an offset of the measured signals into account, or the measured signals may be smoothed. In FIG. 1a, signal conditioner 11 is forwarding a corrected combustion chamber pressure P' and a corrected angle of rotation W'.

In a maximum value determination 12 a maximum combustion chamber pressure Pmax is determined from corrected combustion chamber pressure P'. A comparison method or some other interpolation method may be used for this purpose. A plausibility check is able to be carried out with the aid of corrected angle of rotation W'. For instance, determined maximum combustion chamber pressure Pmax must occur at a crank angle of approximately 180 degrees.

A comparison 13 will then be implemented. To this end, a setpoint value Pmax_des for the maximum combustion chamber pressure is subtracted from the ascertained maximum combustion chamber pressure Pmax. The resulting pressure differential d_Pmax may be smaller or greater than zero. Furthermore, this pressure differential d_Pmax is forwarded to a regulator 14, which preferably is a PI regulator.

If maximum combustion chamber pressure Pmax is smaller than setpoint value Pmax_des, and if pressure differential d_Pmax therefore is smaller than zero, then regulator 14 will not become active. However, if maximum combustion chamber pressure Pmax is greater than setpoint value Pmax_des, and if pressure differential d_Pmax therefore is greater than zero, then regulator 14 will be activated. It is understood that the activation criterion of regulator 14 may be combined with a hysteresis function.

If regulator 14 is activated, regulator 14 is provided to influence internal combustion engine 10 in such a way that maximum combustion chamber pressure Pmax decreases again and becomes at least equal to or, if possible, smaller than setpoint value Pmax_des for the maximum combustion chamber pressure.

According to FIG. 1a, an engine control 15 is provided, which quite generally is configured to control and/or regulate internal combustion engine 10. On the input side, engine control 15 is acted upon by one or a plurality of performance quantities of internal combustion engine 10. These may be the already elucidated performance quantities, but other performance quantities as well, which may be generated in any desired manner. The performance quantities are a function of the instantaneous operating state of internal combustion engine 10, and thus of its instantaneous operating point.

Engine control 15 is configured such that it is able to derive from the performance quantities on the input side signals that may be used to trigger, and thus operate, internal combustion engine 10. For instance, engine control 15 is able to generate signals for controlling a throttle valve, for example, or for opening and closing an injection valve of internal combustion engine 10.

In the following text it is assumed that the fuel is injected into the cylinders of internal combustion engine 10 with the aid of injection valves during a working cycle of internal combustion engine 10, i.e., during a movement of the crankshaft of 720 degrees, in the form of at least one pre-injection and at least one main injection.

In FIG. 1a, by way of example, engine control 15 generates two signals, which are provided for controlling an injection valve of internal combustion engine 10. On the one hand, this is a signal AB_MI for the start of injection of the main injection and, on the other hand, a signal AD_MI for the injection duration of the main injection. As explained, these signals are determined by engine control 15 as a function of performance quantities of internal combustion engine 10 for the instantaneous operating point of internal combustion engine 10.

As likewise explained, regulator 14 is not active as long as maximum combustion chamber pressure Pmax is smaller than setpoint value Pmax_des. There is no need for a correction of maximum combustion chamber pressure Pmax in this case. Signals AB_MI and AD_MI for the start of injection and the injection duration, respectively, which are determined by engine control 15, are therefore forwarded in unchanged form and thus applied to the particular injection valve without modification.

However, if maximum combustion chamber pressure Pmax is greater than setpoint value Pmax_des, regulator 14 will be activated. In this case regulator 14 generates an output signal d_AB_MI, which represents a correction value for the start of injection of the main injection. In a downstream addition 16, this correction value is linked to signal AB_MI for the start of injection of the main injection. This results in a shift of the start of injection of the main injection toward a later point in time. In other words, a retard of the main injection is implemented with the aid of output signal d_AB_MI of regulator 14.

This retard of the main injection is implemented by regulator 14 until maximum combustion chamber pressure Pmax is once again at least equal to, or smaller than, setpoint value Pmax_des for the maximum combustion chamber pressure. This prevents that setpoint value Pmax_des for the maximum combustion chamber pressure is exceeded for a longer period of time.

If regulator 14 is active, output signal d_AB_MI of regulator 14 is simultaneously forwarded to a control 17. Control 17 is provided to generate an output signal d_AD_MI, which represents a correction value for the injection duration of the main injection. In a downstream subtraction 18, this correction value is linked to signal AD_MI for the injection duration of the main injection. This results in a shortening of the injection duration of the main injection. In other words, the fuel mass injected during the main injection is reduced with the aid of output signal d_AD_MI of control 17.

Control 17 is able to generate output signal d_AD_MI in proportion to output signal d_AB_MI of regulator 14. A weighting factor may be provided for this purpose. A characteristic field may alternatively be stored in control 17 by which the dependency of output signal d_AD_MI from output signal d_AB_MI may be realized in a non-linear manner as well, and/or, additionally, as a function of other performance quantities of internal combustion engine 10.

The reduced fuel mass of the main injection causes the temperature of the exhaust gas produced by the combustion of the fuel to be reduced as well, or at least not to be increased. Especially in the discharge zone of the cylinders of internal combustion engine 10, and thus in the area of an exhaust-gas turbocharger disposed there, the prevailing temperature in this location is reduced in this manner. There is no need to measure the temperature in the discharge zone of internal combustion engine 10.

The explained retard of the main injection caused by regulator 14 is therefore accompanied by the aforementioned reduction in the fuel mass to be injected during the main injection and caused by control 17. This not only manages to lower or restrict the maximum combustion chamber pressure in the cylinders of internal combustion engine 10, but also reduces or restricts the temperatures occurring in the discharge zone of internal combustion engine 10.

The explained influencing of the start of injection and the injection duration of the main injection may be determined and implemented jointly for all cylinders of internal combustion engine 10. It is also possible to implement the indicated influencing individually for each cylinder.

Instead of the above-explained influencing of the injection duration of the main injection, it is also possible to influence a setpoint value for the engine torque to be supplied by internal combustion engine 10, and preferably reduce it. In a corresponding manner, a charge pressure, and/or a charge-air temperature of a possibly provided exhaust-gas turbocharger, and/or a so-called rail pressure acting on the fuel, and/or a fresh air rate of the air supplied to internal combustion engine 10, and/or a recirculation rate of a possibly provided exhaust gas recirculation. These options may be realized as an alternative or in any desired combination.

The elucidated functions, in particular regulator 14, engine control 15, and control 17, may be realized with the aid of an electronic control device. This control device may at least partially be configured according to analog circuit technology. The control device preferably includes a computer and a storage medium; a computer program, which is able to run on a computer and is then suited to execute the elucidated functions, is stored on the storage medium.

Figure 1B:
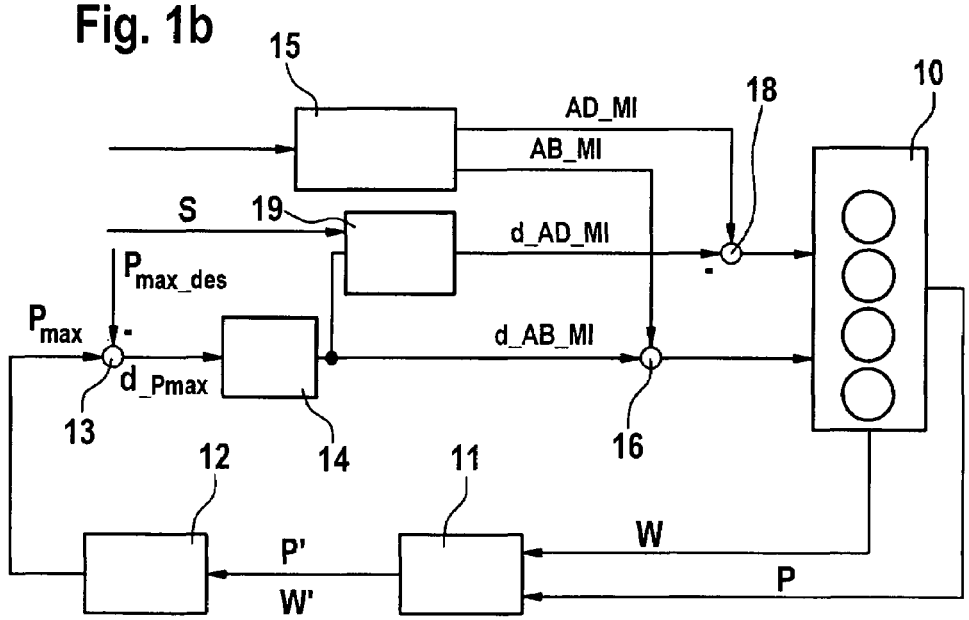

FIG. 1b shows a second exemplary embodiment of a method for operating an internal combustion engine 10. FIG. 1b largely corresponds to FIG. 1a. In this respect, the reference numerals from FIG. 1a have been adopted in FIG. 1b. Reference is made to the explanations in connection with FIG. 1a as far as these agreements are concerned.

Deviating from FIG. 1a, no control 17 but a regulator 19 is provided in the exemplary embodiment of FIG. 1b. As in FIG. 1a, output signal d_AB_MI of regulator 14 is forwarded to this regulator 19. Once again as in FIG. 1a, regulator 19 generates output signal d_AD_MI. However, in contrast to FIG. 1a, regulator 19 is additionally supplied with a signal S as input signal.

In particular, as a function of a comparison of this signal S to the supplied output signal d_AB_MI, regulator 19 generates output signal d_AD_MI in such a way that this output signal d_AD_MI represents the already elucidated correction value for the injection duration of the main injection. In a downstream subtraction 18, this correction value is linked to signal AD_MI for the injection duration of the main injection. This results in a shortening of the injection duration of the main injection.

That is to say, a reduction in the fuel mass injected during the main injection is implemented with the aid of output signal d_AD_MI of regulator 19. This has the result that the instantaneous temperature in the discharge zone of internal combustion engine 10 is reduced or at least not increased any further.

Signal S may be a setpoint value, which represents the maximum temperature tolerated in the discharge zone of internal combustion engine 10. This setpoint value may be specified or be modifiable via a characteristics field, as a function of performance quantities of internal combustion engine 10, if appropriate. In this case the temperature in the discharge zone of internal combustion engine 10 is therefore restricted to the aforementioned setpoint value with the aid of regulator 19.

As an alternative, signal S may be a temperature measured by a sensor, the sensor preferably being disposed in the discharge zone of internal combustion engine 10. When regulator 14 is activated, the temperature measured at this instant is stored. In this case the temperature in the discharge zone of internal combustion engine 10 is restricted to the aforementioned stored temperature with the aid of regulator 19.

Alternatively, signal S may be a temperature that represents the temperature in the discharge zone of internal combustion engine 10 and which is determined from performance quantities of internal combustion engine 10 by modeling. When regulator 14 is activated, the temperature measured at this instant will be stored. In this case the temperature in the discharge zone of internal combustion engine 10 is therefore restricted to the aforementioned modeled temperature with the aid of regulator 19.

As an alternative, signal S may be a variable that correlates with the temperature in the discharge zone of internal combustion engine 10, and which, for instance, is derived from the characteristic of combustion chamber pressure P' versus the time. When regulator 14 is activated, the variable determined at this instant is stored. In this case the temperature in the discharge zone of internal combustion engine 10 is restricted to the aforementioned correlating variable with the aid of regulator 19.

It is understood that signal S is also able to be determined in some other manner and that combinations of the aforementioned possibilities are able to be utilized as well.

Figure 2:
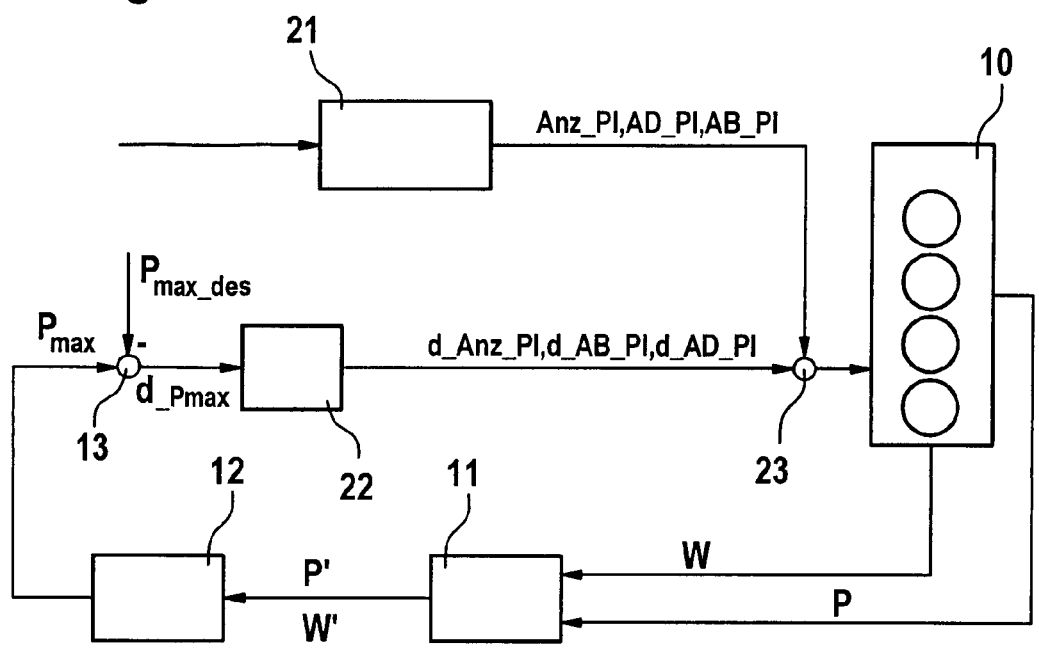

FIG. 2 shows a third exemplary embodiment of a method for operating an internal combustion engine 10. FIG. 2 largely corresponds to FIG. 1a. In this respect, the reference numerals from FIG. 1a have been adopted in FIG. 2.

Reference is made to the explanations in connections with FIG. 1a as far as these agreements are concerned.

An engine control 21, which corresponds to engine control 15 of FIG. 1a, has been provided in FIG. 2. However, in contrast to FIG. 1a, engine control 21 from FIG. 2 is provided to influence the pre-injection of fuel into the cylinders of internal combustion engine 10. To this end, engine control 21 generates a signal Anz_PI, which specifies the number of pre-injections; a signal AB_PI for the start of injection of the pre-injection/s; and a signal AD_PI for the injection duration of the pre-injection/s. As elucidated in connection with FIG. 1a, these signals are determined by engine control 21 as a function of performance quantities of internal combustion engine 10 for the instantaneous operating point of internal combustion engine 10.

Furthermore, a regulator 22 is provided in FIG. 2, which corresponds to regulator 14 from FIG. 1a and which is, in particular, a PI controller. Like regulator 14 in FIG. 1a, regulator 22 of FIG. 2 is also acted upon by pressure differential d_Pmax. However, in contrast to FIG. 1a, engine regulator 22 from FIG. 2 is provided to influence the pre-injection of fuel into the cylinders of internal combustion engine 10. To this end, regulator 22 generates a signal d_Anz_PI, which concerns the number of pre-injections; a signal d_AB_PI, which concerns the start of injection of the pre-injection/s; and a signal d_AD_PI, which concerns the injection duration of the pre-injection/s.

As elucidated in connection with FIG. 1a, the aforementioned signals may be related to all cylinders of internal combustion engine 10 or be determined in a cylinder-specific manner.

As likewise explained in connection with regulator 14 of FIG. 1a, regulator 22 is also not active as long as maximum combustion chamber pressure Pmax is smaller than setpoint value Pmax_des. There is no need for a correction of maximum combustion chamber pressure Pmax in this case. Signals Anz_PI, AB_PI and AD_PI, determined by engine control 21, for the number of pre-injections, the start of injection and the injection duration of the pre-injection/s are therefore forwarded in unchanged form and thus act upon the corresponding injection valve/s in unchanged form.

However, if maximum combustion chamber pressure Pmax is greater than setpoint value Pmax_des, regulator 22 will be activated. It is understood that the activation criterion of regulator 22 may be combined with a hysteresis function. If regulator 22 is activated, it generates signals d_Anz_PI, d_AB_PI and d_AD_PI. These signals constitute correction values for the number of injections, the start of injection and the injection duration of the pre-injection/s. In an addition device 23, these correction values are linked to the respective associated signals Anz_PI, AB_PI and AD_PI. This results in a modification of the number of pre-injections, the start of injection and the injection duration of the pre-injection/s. It is possible in this context that only one of the signals or a combination of the signals is modified.

This modification of the pre-injection/s is implemented by regulator 22 until, for one, maximum combustion chamber pressure Pmax-is once again at least equal to or smaller than setpoint value Pmax_des for the maximum combustion chamber pressure and, for another, the temperature in the discharge zone of internal combustion engine 10 likewise becomes lower, or at least not greater. This prevents that setpoint value Pmax_des for the maximum combustion chamber pressure on the one hand, and a maximally permitted temperature in the discharge zone on the other hand are exceeded for a longer period of time.

Figure 3:
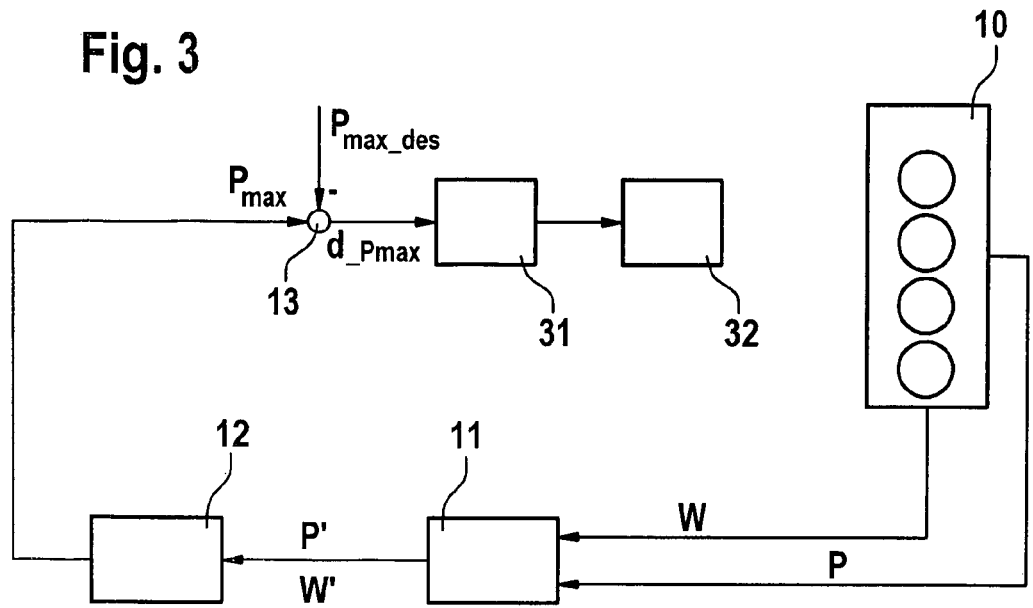

FIG. 3 shows a fourth exemplary embodiment of a method for operating an internal combustion engine 10. FIG. 3 largely corresponds to FIG. 1a. In this respect, the reference numerals from FIG. 1a have been adopted in FIG. 3. Reference is made to the explanations in connections with FIG. 1a with regard to these agreements.

In FIG. 3 a monitoring unit 31 is provided, to which pressure differential d_Pmax is forwarded. If maximum combustion chamber pressure Pmax is smaller than setpoint value Pmax_des, and if pressure differential d_Pmax is therefore smaller than zero, monitoring unit 31 will not become active. However, if maximum combustion chamber pressure Pmax is greater than setpoint value Pmax_des, and if pressure differential d_Pmax therefore is greater than zero, monitoring unit 31 will be activated. Instead of the value "zero", some other value may be provided as activation criterion, if necessary. Furthermore, if appropriate, the activation criterion may also be combined with a hysteresis function.

If monitoring unit 31 is activated, this is forwarded to an engine control system 32. On the one hand, it can take measures to prevent damage to internal combustion engine 10 resulting from an excessive maximum combustion chamber pressure. For example, engine control system 32 may initiate an operation under emergency conditions of internal combustion engine 10. On the other hand, engine control system 32 is able to generate a display for the operator of internal combustion engine 10, i.e., in particular the driver of the motor vehicle. The driver is therefore aware of the excessive maximum combustion chamber pressure and is able to have internal combustion engine 10 checked and possibly repaired. Furthermore, it is possible that the activation of monitoring unit 31 is stored in engine control system 32, so that the excessive maximum combustion chamber pressure that has occurred is able to be taken into account in a subsequent inspection or maintenance of internal combustion engine 10.

What is claimed is:

1. An electronic medium storing a computer program capable of being executed by a computer, when executed by the computer, the computer program performing a method of operating an internal combustion engine of a motor vehicle, the internal combustion engine having a combustion chamber and an injection valve by which fuel is able to be supplied to a combustion chamber directly or via an intake manifold, and a maximum combustion chamber pressure, the method comprising:
   determining a signal for a start of an injection of fuel;
   influencing the signal for the start of injection as a function of the maximum combustion chamber pressure; and
   ascertaining and influencing a signal for an injection duration of fuel as a function of the maximum combustion chamber pressure.

2. A storage medium storing a computer program capable of being executed by a computer, when executed by the computer, the computer program performing a method of operating an internal combustion engine of a motor vehicle, the internal combustion engine having a combustion chamber and an injection valve by which fuel is able to be supplied to a combustion chamber directly or iva an intake manifold, and a maximum combustion chamber pressure, the method comprising:
   determining a signal for a start of an injection of fuel;
   influencing the signal for the start of injection as a function of the maximum combustion chamber pressure; and
   ascertaining and influencing a signal for an injection duration of fuel as a function of the maximum combustion chamber pressure.

3. A control device of an internal combustion engine, the control device adapted to operate an internal combustion engine of a motor vehicle, the internal combustion engine having a combustion chamber and an injection valve by which fuel is able to be supplied to a combustion chamber directly or via an intake manifold, and a maximum combustion chamber pressure, the control device adapted to: determine a signal for a start of an injection of fuel, influence the signal for the start of injection as a function of the maximum combustion chamber pressure, and ascertain and influence a signal for an injection duration of fuel as a function of the maximum combustion chamber pressure.

4. A method for operating an internal combustion engine, the internal combustion engine having a combustion chamber and an injection valve by which fuel is able to be supplied to the combustion chamber, directly or via an intake manifold, the method comprising:
   determining a maximum combustion chamber pressure;
   comparing the maximum combustion chamber pressure with a setpoint value for the maximum combustion chamber pressure; and
   activating a monitoring unit when the maximum combustion chamber pressure becomes greater than the setpoint value for the maximum combustion chamber pressure.

5. The method as recited in claim 4, further comprising:
   switching the internal combustion engine into an operation under emergency conditions when the monitoring unit is activated.

6. The method as recited in claim 4, further comprising:
informing an operating of the internal combustion engine when the monitoring unit is activated.

7. A method for operating an internal combustion engine of a motor vehicle, the internal combustion engine having a combustion chamber and an injection valve by which fuel is able to be supplied to the combustion chamber directly or via an intake manifold, and a maximum combustion chamber pressure, the method comprising:
determining a signal for a start of an injection of fuel;
influencing the signal for the start of injection as a function of the maximum combustion chamber pressure; and
ascertaining and influencing a signal for an injection duration of fuel as a function of the maximum combustion chamber pressure.

8. The method as recited in claim 7, wherein a setpoint value is specified, and the method further comprises:
influencing the signal for the start of injection in such a way that the setpoint value for the maximum combustion chamber pressure is not exceeded.

9. The method as recited in claim 7, further comprising:
comparing the maximum combustion chamber pressure with a setpoint value for the maximum combustion chamber pressure, wherein the signal for the injection duration is influenced as a function of the comparison.

10. The method as recited in claim 7, wherein the signal for the injection duration is influenced in such a way that a maximum temperature in a discharge zone of the internal combustion engine is not exceeded.

11. The method as recited in claim 7, wherein the signal for the start of injection is influenced in a direction of a retard of the start of injection, and wherein the signal for the injection duration is influenced in a direction of a shortening of the injection duration.

12. The method as recited in claim 7, wherein the influencing of the signal for the injection duration is controlled or regulated.

13. The method as recited in claim 7, wherein the signal for the start of injection and the signal for the injection duration relate to a main injection.

14. The method as recited in claim 7, further comprising:
influencing at least one of: a setpoint value for an engine torque to be supplied by the internal combustion engine, a charge pressure, a charge air temperature of an exhaust gas turbocharger, a rail pressure acting on fuel, a fresh air rate of air supplied to the internal combustion engine, and a recirculation rate of an exhaust gas recirculation.

15. The method as recited in claim 7, wherein the method is applied in a cylinder-individual manner.

16. The method as recited in claim 7, wherein the signal for the start of injection and the signal for the injection duration relate to at least one pre-injection.

17. The method as recited in claim 16, further comprising:
ascertaining and influencing a signal for a number of pre-injections as a function of the maximum combustion chamber pressure.

* * * * *